H. W. EICHBAUM.
DYNAMO ELECTRIC MACHINE.
APPLICATION FILED JUNE 25, 1917.

1,275,665.

Patented Aug. 13, 1918.

Inventor
Herman W. Eichbaum
by Hazard & Miller
Att'ys.

UNITED STATES PATENT OFFICE.

HERMAN W. EICHBAUM, OF VENICE, CALIFORNIA.

DYNAMO-ELECTRIC MACHINE.

1,275,665.  Specification of Letters Patent.  Patented Aug. 13, 1918.

Application filed June 25, 1917. Serial No. 176,788.

*To all whom it may concern:*

Be it known that I, HERMAN W. EICHBAUM, a citizen of the United States, residing at Venice, in the county of Los Angeles and State of California, have invented new and useful Improvements in Dynamo-Electric Machines, of which the following is a specification.

This invention relates to dynamo electric machinery.

It is the principal object of this invention to provide an electric machine which may be compactly designed and provided with means whereby its capacity may be increased or decreased in a convenient manner.

Other objects will appear hereinafter.

The invention is illustrated, by way of example, in the accompanying drawings in which.

Figure 2:
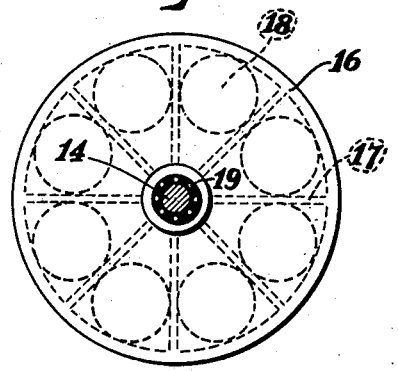
Fig. 2 is a view in section and side elevation illustrating the construction of one of the armatures.
Figure 3:
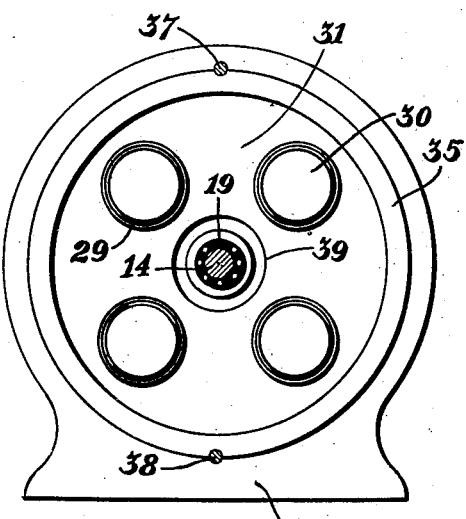
Fig. 3 is a view in section and elevation illustrating the case of the machine and a plurality of field coils mounted therein.

Referring more particularly to the drawings, 10 indicates the case of a dynamo electric machine formed with a base 11 upon which it rests. The ends of the case have bearings 12 and 13 which are horizontally alined and are adapted to receive an armature shaft 14. This shaft is provided with a mounting for a series of armature units 15, two of which are here shown. As indicated in Fig. 2, the armature units comprise a circular frame 16 having radial arms 17. Between these arms armature coils 18 are placed. These coils are substantially flat and are of simple winding. A lead wire extends from each of the coils to one of a series of contact members 19 which are arranged concentrically within the hub of the armature and around the rotating axis thereof. These contacts are adapted to be slightly exposed so that the various armatures will be electrically connected, when assembled. A segmental commutator 20 is secured to the armature shaft and its segments are separately connected to corresponding contacts 19. Brushes 21 and 22 continuously bear upon the outer periphery of the commutator and connect with conductors 23 and 24 which extend from the machine. As here shown the shanks of the brush supports extend through insulating bushings 25 and 26.

The armatures are spaced a distance from each other and upon opposite sides of them are interposed field coils. In the drawings sets of field coils 27 and 28 are secured to the opposite ends of the case 10, while a similar set 29 is mounted between the armatures. It will be noted that the field coils are fitted with horizontally extending cores 30, around which the windings are disposed. The inner ends of the cores of coils 27 and 28 terminate adjacent the outer sides of the armatures. The opposite ends of the central coils are positioned with their cores adjacent the inner faces of the armatures. In this manner the armatures will be interposed between north and south poles and the outer north and south pole faces of the coils 27 and 28 will unite with the ends of the motor case, thus forming a complete magnetic circuit which will pass through the fields and the case continuously in a single direction of travel. This will also insure that the lines of magnetic force will be parallel and that they will be cut at right angles by the armatures.

In order that the capacity of the dynamo electric machine may be increased or decreased without discarding the entire structure, the field coils 29 are mounted upon a disk 31 and extend outwardly from opposite sides thereof. This disk is formed integral with a casing ring 32 of the same sectional contour as the case itself. One end of the ring is counter-bored, as indicated at 33, to receive a lip 34 extending outwardly from the casing. The other end of the ring is formed with a lip 35 extending within a counter-bore 36 formed upon the opposite section of the casing. In this manner the two casing ends and the casing ring may be assembled to form an enlarged case. Stay bolts 37 and 38 extend the length of the casing members and bind them together. It is preferable that the armature shaft 14 is considerably longer than the length of the end casing members so that a plurality of casing rings 32 may be interposed between the casing ends to increase the magnetic field of the motor and to permit additional armatures to be mounted between the various field units. A central opening 39 occurs through the disk 31 of the casing rings. This opening will accommodate the armature shaft and also the hub of one of the armatures, thus allowing communication to be established between the coils of the armature and the commutator.

The electrical machine illustrated in the drawings is of the direct current type, but it will be understood that changes might be made in the armature and field construction with windings to provide an alternating current machine.

Figure 4:
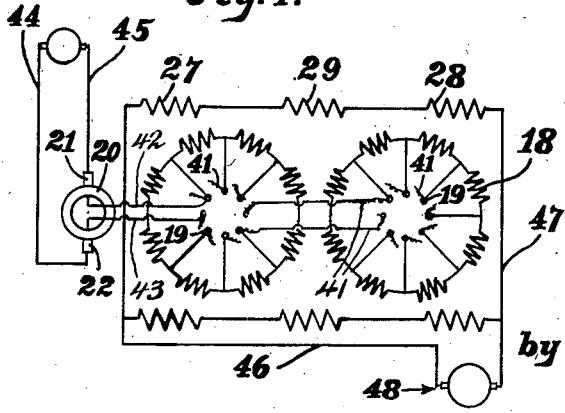
Fig. 4 is a view in diagram illustrating the wiring arrangement of the armature and field coils, only two of the connections being shown complete, the other connections being broken away.

In operation as a dynamo, the armature shaft is rotated by the pulley 40 and as it rotates will carry the armatures 15 with it. These armatures, as previously described, are interposed between the field magnets 27, 28 and 29 and will cut the lines of magnetic force which occur between the poles of these magnets. A flow of current will be established from the first or right-hand set of armature coils 18 to the adjacent contacts 19 and from the contacts 19 along interposed conductors 41 to similar contacts 19 upon the next armature. At the commutator or left-hand end of the machine one-half of the contacts 19 are fastened to commutator lead wires 42 while the other half of the contacts 19 are fastened to commutator lead wires 43. In Fig. 4 I have shown only two of the connections between the contacts 19 and the commutator, the other connections being broken away. The commutator lead wires 42 and 43 connect with segments of the commutator 20. Thereafter the current will be conveyed through the brushes 21 and 22 to the leads 44 and 45. Field coils are connected with conductors 46 and 47 which lead to an exciter 48, thus completing the wiring arrangement of the machine. In case the capacity of the machine is to be increased the stay bolts may be removed from the case and additional casing rings and armatures alternately positioned, as indicated in the drawings. Thus the field may be increased, as desired and sufficient armature wiring added to produce an adjacent operating machine.

Figure 1:
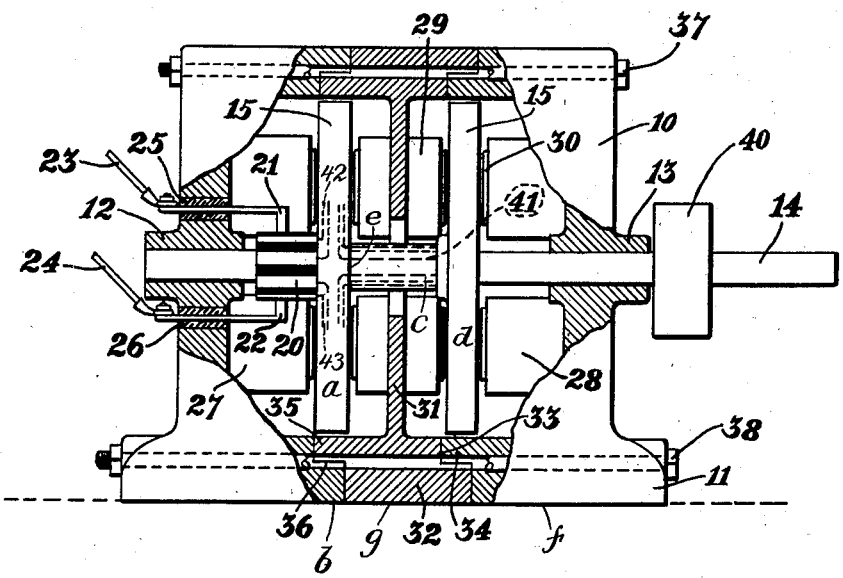
Figure 1 is a view in section and elevation illustrating the completely assembled machine with parts broken away to more clearly disclose the relation of the armatures to the fields.

Referring to Fig. 1, the armature —a— is built integral with the commutator 20 and goes with the section —b— of the case 10. The hub —c— carrying the conductors 41 goes along with the armature —d— and the ends of the conductors 41 abut against the contact points 19 in the armature —a— on the line —e—. If it is desired to add another unit to a machine like that shown in Fig. 1 the section —f— of the case 10 and the pulley 40 would be removed from the shaft 14 and another unit carrying a section —g— of the case, a hub —c—, an armature —d—, a field 29, and a disk 31, would be placed upon the shaft 14 with the hub —c— abutting against the armature —d— and the section —f— placed upon the shaft against this new unit. It will thus be seen that the electric machine here devised is decidedly simple in its construction and may be easily adapted for various capacities and uses.

While I have shown the preferred construction of my dynamo electric machine as now known to me, it will be understood that various changes in the combination, construction and arrangement of parts may be made by those skilled in the art without departing from the spirit of my invention.

I claim:

1. A dynamo electrical machine comprising armature and field coil units mounted in independent case sections separable on transverse lines; said armature units having terminals, so that units may be inserted or removed to make a machine of the desired capacity; the terminals of one armature unit contacting with the terminals of another armature unit so as to complete the circuits.

2. In a dynamo electrical machine, independent case sections carrying field coils and armature units having terminals adapted to butt to complete the circuits; so that units may be removed or inserted to make a machine of the desired capacity.

3. A dynamo electrical machine comprising a sectional case separable on transverse lines, field coil and armature units mounted in the sections and the armature units having terminals adapted to abut together, an armature shaft extending through the armatures, and a commutator upon one end of the shaft; so that field coil and armature units and case sections may be removed or inserted to increase or decrease the capacity of the machine.

In testimony whereof I have signed my name to this specification.

HERMAN W. EICHBAUM.